(12) United States Patent
Tang et al.

(10) Patent No.: US 9,037,755 B2
(45) Date of Patent: May 19, 2015

(54) TWO-IN-ONE CFP FORM-FACTOR PLUGGABLE ADAPTER

(75) Inventors: Norman Tang, Los Altos, CA (US);
Liang Ping Peng, Santa Clara, CA (US);
David Lai, Mountain View, CA (US);
Anthony Nguyen, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 384 days.

(21) Appl. No.: 13/400,759

(22) Filed: Feb. 21, 2012

(65) Prior Publication Data

US 2013/0215936 A1    Aug. 22, 2013

(51) Int. Cl.
*G06F 3/00* (2006.01)
*H04B 10/00* (2013.01)
*H04L 12/413* (2006.01)

(52) U.S. Cl.
CPC ................ *H04L 12/413* (2013.01); *G06F 3/00* (2013.01)

(58) Field of Classification Search
CPC .......................................... G02B 6/4246–6/43
USPC .......................................................... 710/10
See application file for complete search history.

(56) References Cited

U.S. PATENT DOCUMENTS

| 7,317,934 | B2 * | 1/2008 | Xu et al. ........................ 455/561 |
| 8,075,199 | B2 | 12/2011 | Losio et al. |
| 8,419,444 | B2 * | 4/2013 | Kagan et al. .................. 439/76.1 |
| 2009/0257754 | A1 * | 10/2009 | Theodoras et al. ............ 398/135 |
| 2011/0081807 | A1 * | 4/2011 | Rephaeli et al. .......... 439/620.21 |
| 2013/0273766 | A1 * | 10/2013 | Lindkamp ..................... 439/345 |

* cited by examiner

*Primary Examiner* — Titus Wong
(74) *Attorney, Agent, or Firm* — Edell, Shapiro & Finnan, LLC

(57) ABSTRACT

Techniques are provided describing a first connector unit that receives first data from a first transceiver and a second connector unit that receives second data from a second transceiver. A switch unit is configured to receive first switch data from the first connector unit at a first data rate and second switch data from the second connector unit at the first data rate. A third connector unit receives the first switch or the second switch data from the switch unit and a second portion of the second data from the second connector unit. The third connector unit also sends the first switch data to a host port when the first connector unit receives the first data and to send the second switch data and the second portion of the second data to the host port when the second connector unit receives the second data.

20 Claims, 5 Drawing Sheets

TWO-IN-ONE CFP FORM-FACTOR PLUGGABLE ADAPTER

TECHNICAL FIELD

The present disclosure relates to a "C" form-factor pluggable (CFP) form-factor module for data communication and multiple data transmission rates.

BACKGROUND

A "C" form-factor pluggable (CFP) module is a hot pluggable transceiver that is designed for data transmissions in compliance with both 40 gigabit Ethernet (40G) standards and 100 gigabit Ethernet (100G) standards. A quad-small form-factor pluggable (QSFP) module and a "CXP" module (in compliance with standards set forth by the InfiniBand Trade Association) are designed for data transmissions that adhere to the 40G Ethernet standards and the 100G Ethernet standards, respectively. In order to meet cost-sensitive switching and data center price targets, data communications between different types of transceiver modules are required. However, development of adapters to enable data communications between individual modules requires significant overhead, including independent product development costs.

DESCRIPTION OF EXAMPLE EMBODIMENTS

Overview

Techniques are provided describing a first connector unit configured to receive first data from a first transceiver and a second connector unit configured to receive second data from a second transceiver. The first transceiver and the second transceiver are configured to perform data communications with the host port via the two-in-one adapter. A switch unit is electrically connected to the first connector unit via a first set of signal paths and to the second connector unit via a second set of signal paths. The switch unit is configured to receive first switch data from the first connector unit at a first data rate across the first set of signal paths in response to the first connector unit receiving the first data, wherein the first switch comprises the first data. The switch unit is also configured to receive second switch data from the second connector unit at the first data rate across the second set of signal paths in response to the second connector unit receiving the second data, wherein the second switch data comprises a first portion of the second data received. The third connector unit is electrically connected to the switch unit via a third set of signal paths and to the second connector unit via a fourth set of signal paths. The third connector unit is configured to receive the first switch or the second switch data from the switch unit across the third set of signal paths at the first data rate. The third connector unit is also configured to receive a second portion of the second data from the second connector unit across the fourth set of signal paths at a second data rate in response to the second connector unit receiving the second data. The third connector unit is further configured to send the first switch data to a host port in response to instructions received from the host port to send the first switch data and to send the second switch data and the second portion of the second data to the host port in response to instructions received from the host port to send the second switch data.

Example Embodiments

Figure 1:
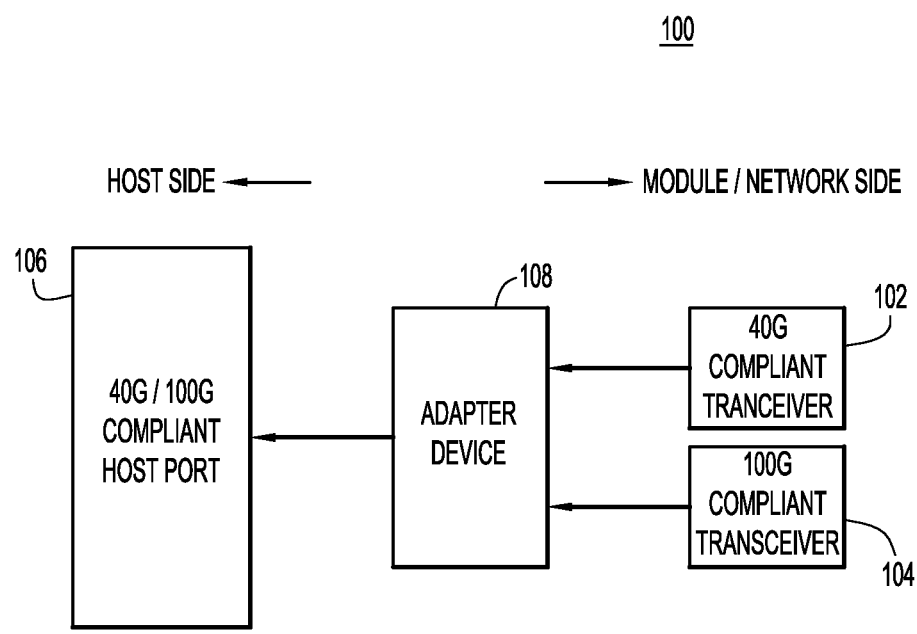
FIG. 1 is an example topology depicting a plurality of transceiver devices configured to interface with an adapter device to send and receive data communications to a host port.

The techniques described herein are directed to a two-in-one adapter for sending and receiving data from multiple transceiver modules at multiple transmission rates. An example topology 100 is illustrated in FIG. 1. The topology 100 has a plurality of transceiver devices, which are shown at reference numerals 102 and 104. The topology 100 also shows a host port device ("host port") 106 and an adapter apparatus or device ("apparatus device") 108.

Each of the transceiver devices 102 and 104 is configured to send and receive data. For example, as described hereinafter, the transceiver device 102 is configured to send and receive data to and from the host port 106 via the adapter device 108 residing between the transceiver device 102 and the host port 106. Similarly, the transceiver device 104 is configured to send and receive data to and from the host port 106 via the adapter device 108 residing between the transceiver device 104 and the host port 106. For simplicity, the transmission device 102 is referred to hereinafter as a first transceiver 102 and the transmission device 104 is referred to hereinafter as a second transceiver 104.

As shown in FIG. 1, the first transceiver 102 and the second transceiver 104 reside on one side of the adapter device 108, known as the "network" or "module" side. The host port 106 resides on another side of the adapter device 108, known at the "host side." According to the techniques described hereinafter, data may be transferred from the module side (e.g., from the first transceiver 102 or the second transceiver 104) to the host side (e.g., to the host port 106). These data transmissions are referred to as module-to-host data transmissions. Similarly, according to the techniques described hereinafter, data may be transferred from the host side to the module side, and these data transmissions are referred to as host-to-module data transmissions.

In the module-to-host data transmission scenario, the first transceiver 102 and the second transceiver 104 are configured to receive data originating from corresponding link partners (e.g., communication devices) on the on the module side and to transmit this data to the host port 106 via the adapter device 108. The host port 106 is configured to receive this data from either the first transceiver 102 or the second transceiver 104 via the adapter device 108.

In the host-to-module data transmission scenario, the host port 106 is configured to receive data originating from corresponding link partners (e.g., upper layer communication devices) on the host side and to transmit this data to either the first transceiver 102 or the second transceiver 104 via the adapter device 108. Depending on system configuration settings for the host port 106, either the first transceiver 102 or the second transceiver 104 is configured to receive this data via the adapter device 108.

As described hereinafter, the first transceiver 102 and the second transceiver 104 are not configured to directly interface with (or "plug into") the host port 106. The adapter device 108, however, is configured to interface with the host port 106. Additionally, the adapter device 108 is configured to interface with the first transceiver 102 and the second transceiver 104. In one example, the first transceiver 102 and the second transceiver 104 are pluggable form-factor transceiver modules or devices that are configured to plug into the adapter device 108 at corresponding connector units or ports on the adapter device 108. For example, the first transceiver 102 may be a form-factor pluggable transceiver module that is configured to interface with a first connector unit of the adapter device 108 to engage a first set of pins on the adapter device 108. Similarly, the second transceiver 104 may be a form-factor pluggable transceiver module that is configured to interface with a second connector unit of the adapter device 108 to engage a second set of pins on the adapter device 108. The host port 106 may be a port configured to interface with a host connector unit of the adapter device 108 to engage a host set of pins on the adapter device 108.

In general, the first transceiver 102 and the second transceiver 104 may belong to certain types or families of transceiver modules. Similarly, the host port 106 may belong to a certain type or family of host port. Based on their classifications, the first transceiver 102 and the second transceiver 104 are configured to send and receive data at particular data rates that are in compliance with existing data communication standards. For example, as shown in FIG. 1, the first transceiver 102 is classified as a first transceiver type that is configured to send and receive data that is compliant with a 40 gigabit Ethernet standard (hereinafter "40G," "40G data" or "40G Ethernet"). The second transceiver 104 is classified as a second transceiver type that is configured to send and receive data that is compliant with a 100 gigabit Ethernet standard (hereinafter "100G," "100G data" or "100G Ethernet").

Additionally, based on its classification, the host port 106 may also send and receive data at particular data rates in compliance with existing data communication standards. As shown in FIG. 1, the host port 106 is classified as a host port that is configured to send and receive data that is compliant with both the 40G Ethernet standard and the 100G Ethernet standard.

Transceiver devices of certain families or types may not be compatible or configured to interface directly with a host port belonging to another family or type. In order for transceivers to communicate with a host port belonging to a different family or type (e.g., in order to send and receive data communications between the transceivers and the host port belonging to a different family), adapter devices are needed between the different type of transceivers and the host port. These adapter devices (e.g., the adapter device 108) are configured to interface with each transceiver (e.g., the first transceiver 102 and the second transceiver 104) and with the host port to enable data communications between the transceivers and the host port (e.g., the host port 106). In one example, when the first transceiver 102 and the second transceiver 104 interfaces with the adapter device 108, the combined unit (e.g., the first transceiver 102, the second transceiver 104 and the adapter device 108 interfaced together) acts as a single transceiver to the host port 106.

In one example, the first transceiver 102 may be a quad-small form-factor pluggable (QSFP) module, configured to send and receive 40G data. The QSFP module may not be configured to interface directly with the host port 106, which may be a "C" form-factor pluggable (CFP) port, configured to send and receive either 40G data or 100G data. Similarly, the second transceiver 104 may be a "CXP" module (e.g., as specified by standards set forth by the InfiniBand Trade Association), configured to send and receive 100G data. The CXP module also may not be configured to interface directly with the CFP host port 106. The first transceiver 102, the second transceiver 104 and the host port 106 are, however, configured to interface with the adapter device 108, according to the techniques described hereinafter. Thus, the adapter device 108 allows for both the first transceiver 102 and the second transceiver 104 to send module-to-host data communications to the host port 106, according to the techniques described hereinafter. The adapter device 108 also allows for the host port 106 to send host-to-module data communications to the first transceiver 102 or the second transceiver 104.

For simplicity, the first transceiver 102 is described as a QSFP transceiver module, configured to send and receive 40G data, the second transceiver 104 is described as a CXP module, configured to send and receive 100G data, and the host port 106 is described as a CFP module port, configured to send and receive either 40G data or 100G data. It should be appreciated, however, that the first transceiver 102 and the second transceiver 104 may be other transceivers in accordance with other communication standards and that the host port 106 may be configured as another host port in accordance with another communication standard in order to accomplish the techniques described herein.

Figure 2:
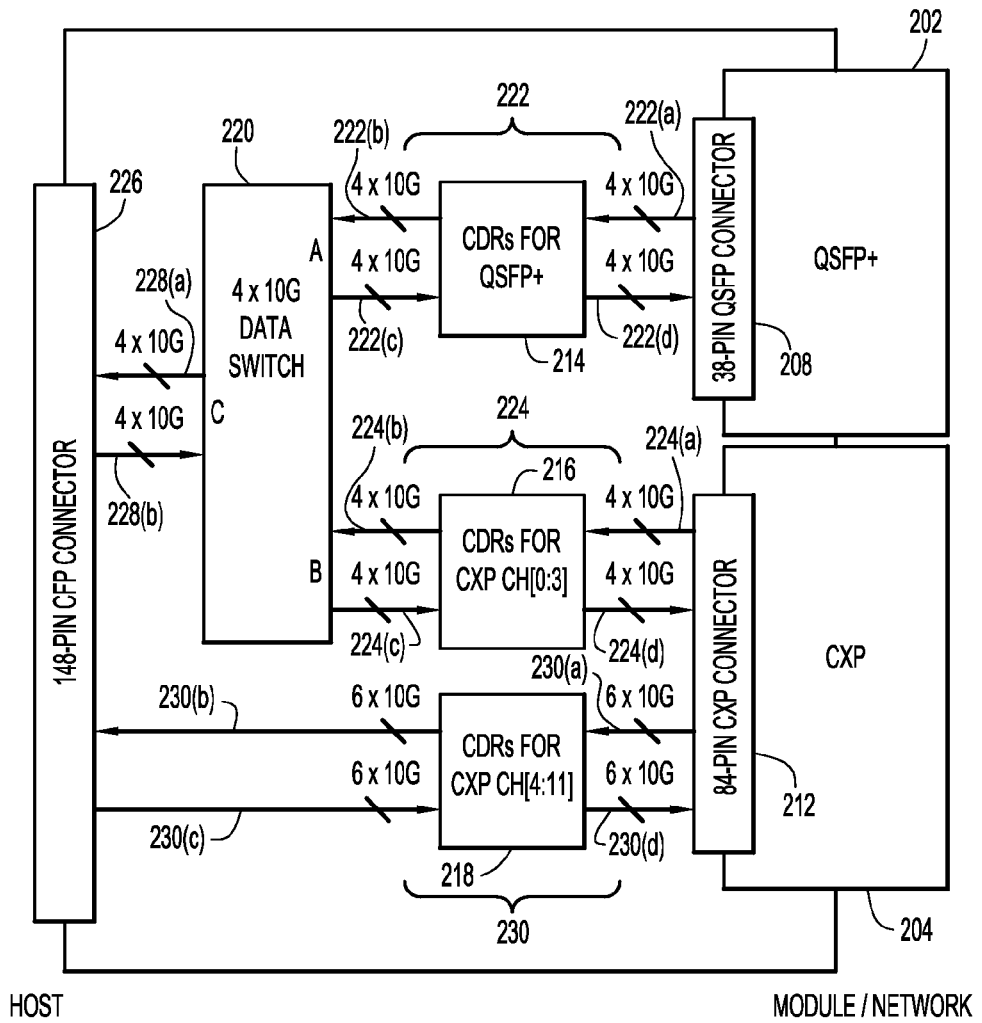
FIG. 2 is an example block diagram depicting components of the adapter device including a switch unit used to send and receive data communications to and from first and second transceivers at multiple transmission bit rates.

Reference is now made to FIG. 2, which shows a block diagram showing components of the adapter device 108. The adapter device 108 comprises a first connector unit 202 and a second connector unit 204. The first connector unit 202 has a first set of signal pins 208. The second connector unit 204 has a second set of signal pins 212. The first set of signal pins 208 may be a 38-pin QSFP connector configured to send and receive 40G data to and from the QSFP or QSFP+ transceiver. The second set of signal pins may be an 84-pin CXP connector configured to send and receive 100G data to and from the CXP transceiver.

The adapter device 108 also comprises a first clock and data recovery (CDR) unit 214 that is electrically connected to the first connector unit 202 via, e.g., the first set of signal pins 208. The adapter device 108 comprises a second CDR unit 216 and a third CDR unit 218 electrically connected to the second connector unit 204 via, e.g., the second set of signal pins 212. Though not shown in FIG. 2, the first CDR unit 214, the second CDR unit 216 and the third CDR unit 218 are coupled to one or more power switch units that are configured to supply power to the first CDR unit 214, the second CDR unit 216 and the third CDR unit 218. A power switch unit, also not shown in FIG. 2, is coupled to the first CDR unit 214 and the second CDR unit 216 and is coupled to the one or more power switch units in order to switch power delivery from the power switch units to the appropriate CDR unit, according to the techniques described hereinafter.

The adapter device 108 further comprises a switch unit 220 that is electrically connected to the first connector unit 202 (e.g., via the first CDR unit 214) and that is electrically connected to the second connector unit 204 (e.g., via the second CDR unit 216). It should be appreciated that though FIG. 2 shows the switch unit 220 electrically connected to the first connector unit 202 and the second connector unit 204 via the respective first CDR unit 214 and the second CDR unit 216, the switch unit 220 may also be directly connected to the first connector unit 202 and the second connector unit 204. The switch unit 220 is connected to the first connector unit 202 via a first set of signal paths 222 between the switch unit 220 and the first connector unit 202. The switch unit 220 is connected to the second connector unit 204 via a second set of signal paths 224 between the switch unit 220 and the second connector unit 204.

The switch unit 220 is also electrically connected to a host set of signal pins 226. The host set of signal pins 226 are configured to interface with the host port 106. For example, the host set of signal pins 226 may be a 148-pin CFP connector configured to interface with a CFP host port and configured to send and receive 40G or 100G data to and from the CFP host port. The switch unit 220 is configured to send and receive data to the host port 106 via the host set of signal pins 226 across a third set of signal paths 228(*a*) and 228(*b*). The second connector unit 204 is also configured to send and receive data to the host port 106 via the host set of signal pins 226 across a fourth set of signal paths 230.

As stated above, the first transceiver 102 is configured to interface with the first connector unit 202 to send module-to-host data communications to the host port 106 (configured to interface with the host set of signal pins 226). Similarly, the second transceiver 104 is configured to interface with the second connector unit 204 to send module-to-host data communications to the host port 106. Likewise, the host port 106 is configured to interface with the host set of signal pins 226 to send host-to-module data communications to the first transceiver 102 or the second transceiver 104.

As stated above, the first transceiver 102 may be the QSFP transceiver configured to send the first data in the module-to-host direction comprising 40G Ethernet data to the adapter device 108. Additionally, the second transceiver 104 may be the CXP transceiver configured to send the second data in the module-to-host direction comprising 100G Ethernet data to the adapter device 108. Also, as stated above, the host port 106 may be the CFP host port configured to send host data in the host-to-module direction comprising either 40G Ethernet data to the adapter device 108 or 100G Ethernet data to the adapter device 108.

It should be appreciated that the host port 106, in one example, is preconfigured to communicate with either the first transceiver 102 or the second transceiver 104. That is, the host port 106 is controlled by a management system on the host side of the topology 100 which instructs the host port 106 to communicate with either the first transceiver 012 or the second transceiver 104. Accordingly, as described herein, the host port 106 sends control messages to the adapter device 108 (e.g., via the host set of signal pins 226) to configure components of the adapter device 108 (e.g., the switching unit 220) to effectuate the communication between the host port 106 and the selected transceiver device.

In the module-to-host direction for data communications, when the first transceiver 102 sends the first data to the adapter device 108 (via the first connector unit 202), the adapter device 108 receives the first data at a data rate of 40 gigabits per second. Similarly, when the second transceiver 104 sends the second data to the adapter device 108 (via the second connector unit 204), the adapter device 108 receives the second data at a data rate of 100 gigabits per second. In the host-to-module direction for data communications, the host port 106 sends the host data to the adapter device 108 (via the host set of signal pins 226) either at a data rate of 40 gigabits per second or 100 gigabits per second, depending on whether the host port 106 is preconfigured to communicate with the first transceiver 102 or the second transceiver 104. The first transceiver 102 receives the 40G data, while the second transceiver 104 receives the 100G data. The module-to-host transmission techniques and host-to-module data transmission techniques are now described in connection with FIG. 2

Module-to-Host Direction for Data Transmission

When data is being sent in the module-to-host direction, the first set of signal pins 208 component of the first connector unit 202 receives the first data at the 40 gigabit data rate from the first transceiver device 102. Alternatively, the second set of signal pins 212 component of the second connector unit 204 receives the second data at the 100 gigabit data rate from the second transceiver 104.

Upon receiving the first data, the first set of signal pins 208 is configured to send the first data to the first CDR device 214 across signal path 222(*a*). The signal path 222(*a*) comprises one or more signal links between the first set of signal pins 208 and the first CDR device 214. For example, the signal path 222(*a*) may comprise four signal links, each of which is configured to carry data at a data rate of ten gigabits per second (hereinafter "10G," "10G data" or "10G Ethernet"), resulting in the 40 gigabit first data being sent to the first CDR unit 214.

Upon receiving the second data, the second set of signal pins 212 is configured to send a first portion of the second data to the second CDR device 216 across signal path 224(*a*). The signal path 224(*a*) also comprises one or more signal links between the second set of signal pins 212 and the second CDR device 216. The signal path 224(*a*) may comprise four signal links, each of which is configured to carry 10G data, resulting in a 40 gigabit portion of the second data being sent to the second CDR unit 214 across these links.

The second set of signal pins 212 is also configured to send a second portion of the second data to the third CDR device 218. In particular, the second set of signal pins 212 is configured to send the second portion of the second data to the third CDR device 218 across signal path 230(*a*). Signal path 230(*a*) may comprise six 10G signal links for carrying the second portion of the second data to the third CDR device 218, thus resulting in a 60 gigabit portion of the second data (hereinafter "60G" or "60G data") being sent across these six 10G signal links.

Though FIG. 2 shows 10G signal links between the first set of signal pins 208 and the first CDR unit 214 and between the second set of signal pins 212 and the respective second CDR unit 216 and third CDR unit 218, it should be appreciated that any number of signal links configured to carry data at any data rate may be deployed between the first set of signal pins 208 and the first CDR unit 214 and between the second set of signal pins 212 and the second CDR unit 216 and the third CDR unit 218.

Upon receiving the first data from the first set of signal pins 208, the first CDR unit 214 is configured to send the first data to the switch unit 220 across signal path 222(*b*). Similar to signal path 222(*a*), signal path 222(*b*) has, for example, four signal links, each of which are configured to carry 10G data from the first CDR unit 214 to the switch unit 220. As with signal path 222(*a*), signal path 222(*b*) may comprise any number of single links configured to carry data at any data rate, and the four 10G signal links are used only as an example. The data received over signal path 222(*b*) by the switch unit 220 may also be referred to as a first switch data, which comprises the first data received by the adapter device 108 from the first transceiver unit 102.

Upon receiving the first portion of the second data from the second set of signal pins 212, the second CDR unit 216 is configured to send the first portion of the second data to the switch unit 220 across signal path 224(*b*). Similar to signal path 222(*b*), described above, signal path 224(*b*) has, for example, four signal links, each of which are configured to carry 10G data from the second CDR unit 216 to the switch unit 220, though it should be appreciated that any number of signal links carrying signals having any data rate may be used.

The data received over the signal path 224(b) by the switch unit 220 may also be referred to as a second switch data. The second switch data comprises the first portion of the second data received by the adapter from the second transceiver unit 104. As shown in FIG. 2, the first portion of the second data comprises a 40 gigabit portion of the 100 gigabit per second data received by the adapter device 108 from the second transceiver 104. Thus, in this example, the switch unit 220 is configured to receive either 40G data originating from the first transceiver 102 or a 40G portion of the 100G data originating from the second transceiver 104.

The switch unit 220 is configured to send data to the host set of signal pins 226 via signal path 228(a). As stated above, the host port 106 may be preconfigured as to whether it should communicate with the first transceiver 102 or the second transceiver 104. Based on this preconfiguration, the host port 106 sends control messages to the adapter device 108 to configure the switch unit 220 accordingly. For example, if the host port 106 is preconfigured to communicate with the first transceiver 102, the adapter 108 will configure the switch unit 220 to receive the first switch data from the first CDR unit 214 and to send or forward the first switch data to the host set of signal pins 226 via the signal path 228(a). Similarly, if the host port 106 is preconfigured to communicate with the second transceiver 104, the adapter 108 will configure the switch unit 220 to receive the second switch data from the second CDR unit 216 and to send or forward the second switch data to the host set of signal pins 226 via the signal path 228(a). The signal path 228(a) may comprise four 10G signal links, thus enabling the switch unit 220 to send 40G data to the host set of signal pins 226 across these signal links. As described above, any number of signal links can be used to send and receive data at any data rate.

The third CDR unit 218 is configured to send the second portion of the second data (e.g., when the host port 106 is preconfigured to receive data from the second transceiver 104) to the host set of signal pins 226 across signal path 230(b), which, for example, comprises six 10G signal links between the third CDR unit 218 and the host set of signal pins 226. As shown in FIG. 2, the second portion of the second data comprises a 60 gigabit portion of the 100G data originating from the second transceiver 104 and received by the adapter device 108 from the second transceiver 104. Thus, the host set of signal pins 226 can receive the second data (100G data) by receiving the first portion of the second data (40G data) from the switch unit 220 and the second portion of the second data (60G data) from the third CDR unit 218.

It should be appreciated that the switch unit 220 is configured to receive only either the first data or the first portion of the second data. That is, according to one example, the switch unit 220 is not configured to receive the first switch data (i.e., the first data) and the second switch data (i.e., the first portion of the second data) concurrently. When the host port 106 is preconfigured to send and receive data to and from the first transceiver 102, the host port 106 sends control messages to the adapter device 108 to instruct the switch unit 220 to "switch" to a first configuration in order to send the received first data to the host set of signal pins 226. Likewise, when the host port 106 is preconfigured to send and receive data to and from the second transceiver 104, the host port 106 sends control messages to the adapter device 108 to instruct the switch unit 220 to "switch" to a second configuration in order to send the first portion of the second data to the host set of signal pins 226. These techniques enable the apparatus device 108, via the switch unit 220, to switch between the first switch configuration and the second switch configuration to send the first data to the host set of signal pins 226 (and ultimately to the host port 106) or to send the first portion of the second data to the host set of signal pins 226 (and ultimately to the host port 106).

As described hereinafter, when the first switch data is being sent from the first CDR unit 214 to the switch unit 220, the power switch unit (not shown) is configured to switch off power delivery from the power source (not shown) to the second CDR unit 216, thus disabling data transmission from the second CDR unit 216 to the switch unit 220. Likewise, when the second switch data is being sent from the second CDR unit 216 to the switch unit 220, the power switch unit is configured to switch off power delivery from the power source to the first CDR unit 214, thus disabling data transmission from the first CDR unit 214 to the switch unit 220. Accordingly, the switch unit 220 receives only either the first data across signal path 222(b) from the first CDR unit 214 (as shown at reference "A" in FIG. 2) or the first portion of the second data across signal path 224(b) from the second CDR unit 216 (as shown at reference "B" in FIG. 2).

Thus, the switch unit 220 is configured to enable the adapter device 108 (e.g., at the instructions of the host port 106) to switch between sending to the host set of signal pins 226 first data, received at a first data rate (e.g., 40G data) by the first connector unit 202 or second data, received at a second data rate (e.g., 100G data) by the second connector unit 204. When the first data is received, all of the 40G data received by the adapter device 108 passes through the switch unit 220 en route to the host set of signal pins 226. When the second data is received, a 40G portion of the 100G data received by the adapter device 108 passes through the switch unit 220 en route to the host set of signal pins 226, while a 60G portion of the 100G data is sent to the host set of signal pins 226 without passing through the switch unit 220. The switch unit 220 allows the adapter device 108 to switch between sending 40G received from the first transceiver 102 and the 40G portion of the 100G data received from the second transceiver 104 for ultimate transmission to the host port 106.

Host-to-Module Direction for Data Transmission

When data is being sent in the host-to-module direction, the host set of signal pins 226 receives host data from the host port 106. The host data may be configured to be sent to either the first transceiver 102 or the second transceiver 104, depending on how the host port 106 is preconfigured, as described above. For example, the host port 106 may be preconfigured to send the host data comprising 40G Ethernet data that is to be sent to the first transceiver 102, or the host port 106 may be preconfigured to send the host data comprising 100G Ethernet data that is to be sent to the second transceiver 104.

Upon receiving the host data, the host set of signal pins 226 is configured to send either the entire host data to the switch unit 220 (e.g., if the host unit 106 is preconfigured to communicate with the first transceiver 102) or a first portion of the host data to the switch unit 220 (e.g., if the host unit 106 is preconfigured to communicate with the second transceiver 104) across signal path 228(b). The signal path 228(b) may comprise, for example, four 10G signal links (though any number of signal links at any data rate may be used), thus enabling the host set of signal pins 226 to send 40G data to the switch unit 220. For example, when the host data comprises the 40G Ethernet data destined for the first transceiver 102, all of the 40G data is sent from the host set of signal pins 226 to the switch unit across the signal path 228(b), and the first portion of the host data comprises all of this 40G data.

When the host data comprises the 100G Ethernet data destined for the second transceiver 104, a first portion of the host data (e.g., 40G data of the 100G data) is sent from the host set of signal pins 226 to the switch unit 220 across signal path 228(b), and the first portion of the host data comprises the 40G data portion of the 100G data. Additionally, when the host data comprises the 100G Ethernet data, the host set of signal pins 226 is configured to send a second portion of the host data (e.g., comprising a remaining 60G data portion of the 100G data) to the third CDR unit 218 across signal links 230(c). The signal links 230(c) may comprise six 10G signal links, thus enabling the host set of signal pins 226 to send 60G data to the third CDR unit 218. It should be appreciated that the signal links 230(c) may comprise any number of signal links at any data rate.

As described above in the module-to-host communications scenario, the host port 106 is configured to send control messages to the adapter device 108 via the host set of signal pins 226. These control messages instruct the adapter device 108 to configure the switch unit 220 to the first switch configuration or the second switch configuration, depending on whether the host port 106 is preconfigured to communicate with the first transceiver 102 or the second transceiver 104.

Upon receiving the first portion of the host data from the host set of signal pins 226, the switch unit 220 sends the first portion of the host data to either the first CDR unit 214 across signal links 222(c) or to the second CDR unit 216 across signal links 224(c). For example, when the host port 106 is preconfigured to send and receive data to and from the first transceiver 102, the host port 106 sends control messages to the adapter device 108 to instruct the switch unit 220 to "switch" to the first configuration in order to send all of the host data (e.g., all of the 40G data intended to be sent to the first transceiver 102) to the first CDR unit 214 across the signal links 222(c). When the host port 106 is preconfigured to send and receive data to and from the second transceiver 104, the host port 106 sends control messages to the adapter device 108 to instruct the switch unit 220 to "switch" to the second configuration in order to send the first portion of the host data (e.g., the 40G data portion of the 100G data) to the second CDR unit 216 across the signal links 224(c). Thus, these techniques enable the adapter device 108, via the switch unit 220, to switch between the first switch configuration and the second switch configuration to send either all of the host data to the first CDR unit 214 (and ultimately to the first transceiver 102) or the first portion of the host data to the second CDR unit 214 (and ultimately to the second transceiver 104). The signal links 222(c) and 224(c) may comprise, for example, four 10G signal links to enable 40G data to be sent from the switch unit to the respective first CDR unit 214 and the second CDR unit 216, though any number of signal links at any data rates may be used.

Upon receiving the host data, the first CDR unit 214 sends or forwards the host data to the first set of signal pins 208 across signal path 222(d). Likewise, upon receiving the first portion of the host data, the second CDR unit 216 sends or forwards the first portion of the host data to the second set of signal pins 212 across signal path 224(d). As with signal paths 222(c) and 222(d), signal paths 224(c) and 224(d) may comprise four 10G signal links, thus enabling 40G data to be sent from the first CDR unit 214 to the first set of signal pins 208 or from the second CDR unit 216 to the second set of signal pins 212.

Figure 3:
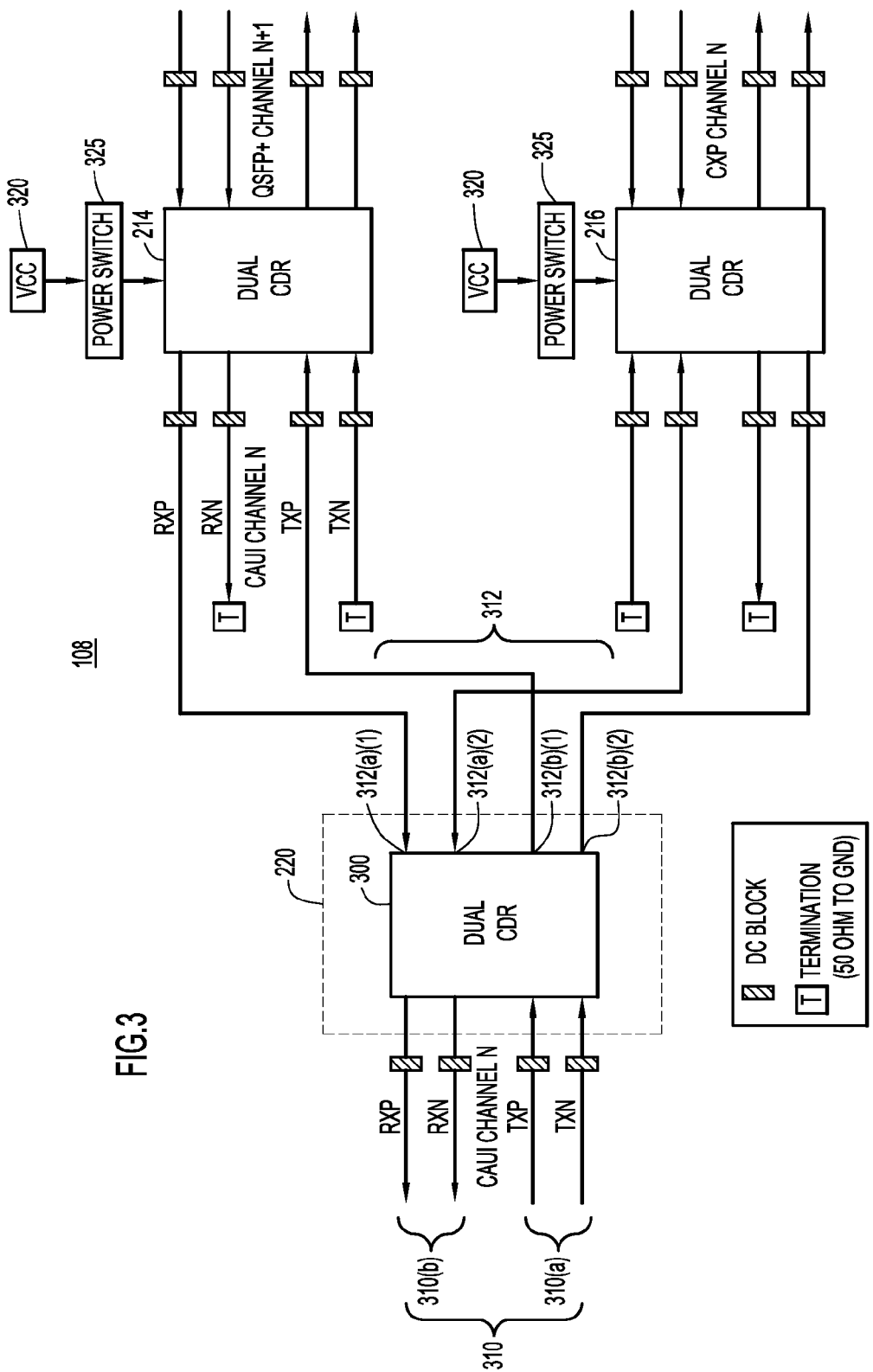
FIG. 3 is an example topology of the adapter device showing the switch unit of the adapter device to perform switching operations for the data communications between the transceiver devices.

When the host port 106 sends the 100G host data, the second set of signal pins 212 also receives the second portion of the host data sent from the third CDR unit 218 across signal paths 230(d). The signal paths 230(d), for example, may comprise six 10G signal links to enable 60G data to be sent from the third CDR unit 218 to the second set of signal pins 212. Thus, when the host port 106 sends the 100G host data, the second set of signal pins 212 receives the 40G first data portion of the 100G host data from the second CDR unit 216 and receives the 60G second data portion of the 100G host data from the third CDR unit 216. Reference is now made to FIG. 3, which shows an example topology of the switch unit 220 of the adapter device 108 utilizing a CDR unit to perform the switching operations. As shown in FIG. 3, the switch unit 220 comprises a switch CDR unit 300 that is configured with a series of host signal paths, shown at reference numeral 310, and a series of module signal paths, shown at reference numeral 312. The host signal paths 310 comprise a pair of transmission ports 310(a) and a pair of reception ports 310(b). The transmission ports are configured to send data from the host set of signal pins 226 to the switch unit 220. The reception ports are configured to send data from the switch unit 220 (e.g., received by the switch unit 220 from the first CDR unit 214 or the second CDR unit 216) to the host set of signal pins 226. The module signal paths 312 comprise a first differential signal input port 312(a)(1) and a second differential signal input port 312(a)(2). The module signal paths 312 also comprise a first differential signal output port 312(b)(1) and a second differential signal output port 312(b)(2).

The first differential signal input port 312(a)(1) is configured to receive the first switch data (described above) from the first CDR unit 214, and the second differential signal input port 312(a)(2) is configured to receive the second switch data (described above) from the second CDR unit 216. Likewise, the first differential signal output port 312(b)(1) is configured to send the first portion of the host data to the first CDR unit 214 and the second differential signal output port 312(b)(2) is configured to send the first portion of the host data to the second CDR unit 214. In other words, the pairs of differential input signal ports 312(a)(1) and 312(a)(2) and the pairs of the differential output signal ports 312(b)(1) and 312(b)(2) are split into single non-differential signal input port and output port pairs, each configured to serve one of the first CDR unit 214 or the second CDR unit 216. In one example, the differential signal input ports 312(a)(1) and 312(a)(2) and the differential signal output ports 312(b)(1) and 312(b)(2) are present for each of the signal links between the first CDR unit 214 and the switch unit 220 and between the second CDR unit 216 and the switch unit 220. Stated another way, each of the 10G signal links between the first and second CDR units and the switch unit may be split into single non-differential signal input and output ports.

The technique of splitting the pairs of the differential input signal ports 312(a)(1) and 312(a)(2) and the differential output signal ports 312(b)(1) and 312(b)(2) into single non-differential signal input port and output port pairs allows the switch unit 220 to send and receive data communications, when appropriate, to the first CDR unit 214 and the second CDR unit 216. For example, the single non-differential output port 312(b)(1) can be utilized to service the first CDR unit 214 to send data communications (e.g., the host data), originating from the host port 106 and intended for the first transceiver 102, to the first CDR unit 214. Likewise, the single non-differential input port 312(a)(1) can be utilized to service the first CDR unit 214 to receive data communications (e.g., the first data), originating from the first transceiver 102 and intended for the host port 106, from the first CDR unit 214. Additionally, the single non-differential output port 312(b)(2) can be utilized to service the second CDR unit 216 to send data communications (e.g., the first portion of the host data), originating from the host port 106 and intended for the second transceiver 104, to the second CDR unit 216. Likewise, the single non-differential input port 312(a)(2) can be utilized to service the second CDR unit 216 to receive data communications (e.g., the first portion of the second data), originating from the second transceiver 102 and intended for the host port 106, from the second CDR unit 216.

FIG. 3 also shows the power switch unit 320 and the power switch 325. The power switch unit 320 is coupled to the first CDR unit 214 via, e.g., power switch 325, and the power switch unit 320 is coupled to the second CDR unit 216 via, e.g., power switch 325. The power switch unit 320 is configured to delivery power to the first CDR unit 214 via the power switch 325 and to the second CDR unit 216 via the power switch 325. As described above, the power switch 325 is configured to switch off power delivery from the power switch unit 320 to the first CDR unit 214 in response to power being delivered from the power switch unit 320 to the second CDR unit 214. This example corresponds to the scenario in the module-to-host data transmission environment where the second data is being delivered from the second transceiver 104 to the host port 106 and corresponds to the scenario in the host-to-module data transmission environment where the host data is being delivered from the host port 106 to the second transceiver 104. The power switch 325 is also configured to switch off power delivery from the power switch unit 320 to the second CDR unit 216 in response to power being delivered from the power switch unit 320 to the second CDR unit 216. This example corresponds to the scenario in the module-to-host data transmission environment where the first data is being delivered from the first transceiver 102 to the host port 106 and corresponds to the scenario in the host-to-module data transmission environment where the host data is being delivered from the host port 106 to the first transceiver 102. The power switch 325, thus, enables the adapter device 108 to switch between data sent to and from the first transceiver 102 and data sent to and from the second transceiver 104 by switching on and off the power associated with corresponding CDR units in the corresponding data transmission paths. In example, the host port 106 can send control messages via the host set of signal pins 226 to the adapter device 108 to control the power switch 325 in order to enable the data switching techniques described above.

Figure 4:
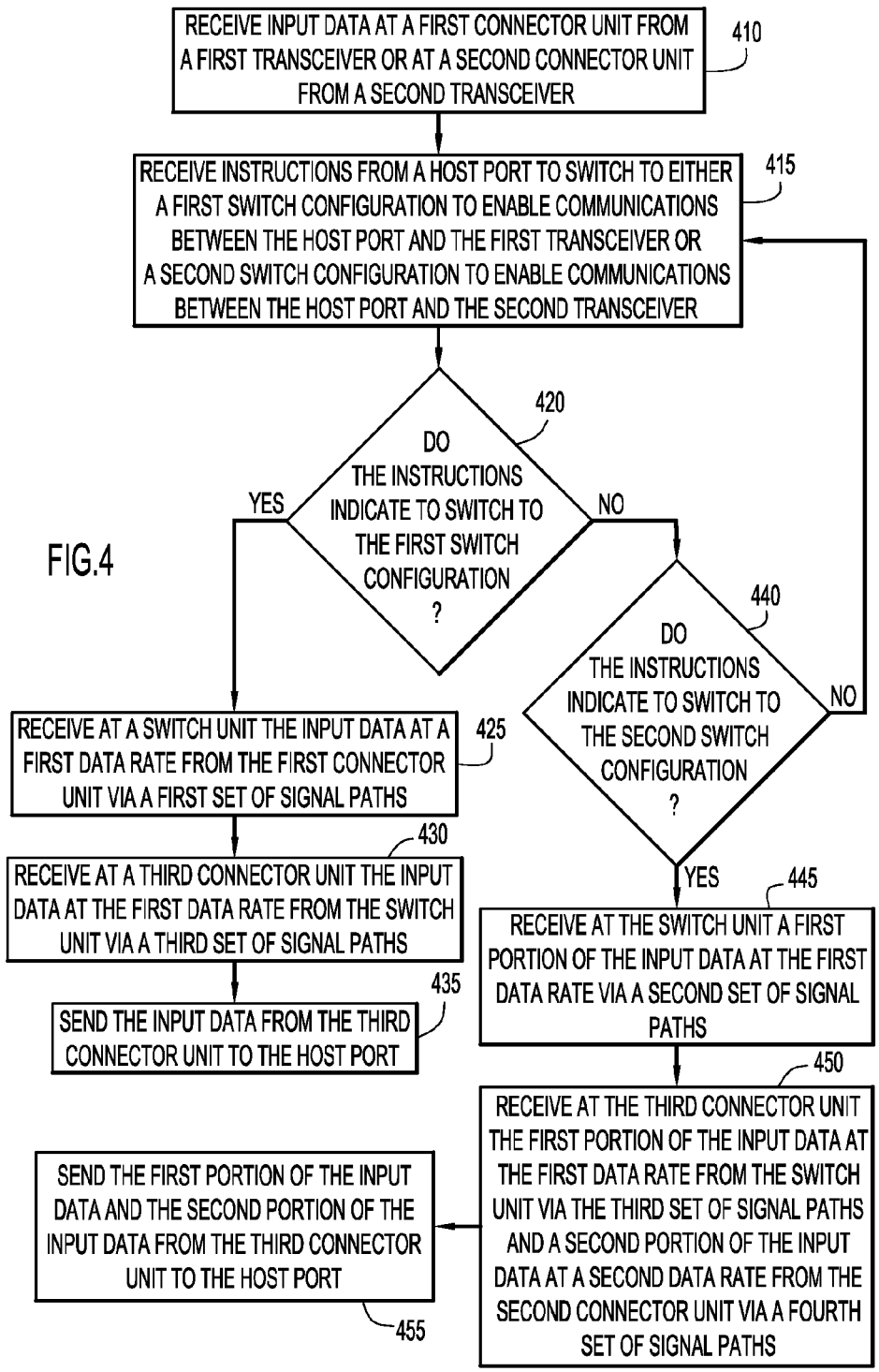
FIG. 4 is an example flow chart for module-to-host data communications between the transceiver devices.

Reference is now made to FIG. 4, which shows an example flow chart for module-to-host data communications between the first transceiver 102 and the host port 106 and between the second transceiver 102 and the host port 106. At operation 410, the adapter device 108 receives input data, either at the first connector unit 202 from a first transceiver 102 or at the second connector unit 204 from the second transceiver 104. At operation 415, the adapter device 108 receives instructions from a host port to switch to either a first switch configuration to enable communications between the host port 106 and the first transceiver 102 or a second switch configuration to enable communications between the host port 106 and the second transceiver 104. At operation 420, a determination is made as to whether the instructions indicate to switch to the first switch configuration. If so, the adapter device 108, at operation 425, receives at the switch unit 220 the input data at a first data rate from the first connector unit via the first set of signal paths (e.g., signal paths 222). At operation 430, the adapter device 108 receives at the third connector unit 226 the input data at the first data rate from the switch unit via the third set of signal paths (e.g., the host set of signal pins 226). At 435, the adapter device 108 sends the input data from the third connector unit 226 to the host port 106.

If the instructions do not indicate to switch to the first switch configuration (i.e., if the answer to decision 420 is "no"), a determination is made at 440 of whether the instructions indicate to switch to the second switch configuration. If so, the adapter device 108, at operation 445, receives at the switch unit 220 a first portion of the input data at the first data rate via the second set of signal paths (e.g., signal paths 224). At operation 450, the adapter device 108 then receives at the third connector unit 226 the first portion of the input data at the first data rate from the switch unit via the third set of signal paths and a second portion of the input data at a second data rate from the second connector unit via a fourth set of signal paths (e.g., signal paths 230). At 455, the adapter device 108 then sends the first portion of the input data and the second portion of the input data from the third connector unit 226 to the host port 106. It should be appreciated that if the answer to decision 440 is "no", the adapter device reverts to operation 415.

Figure 5:
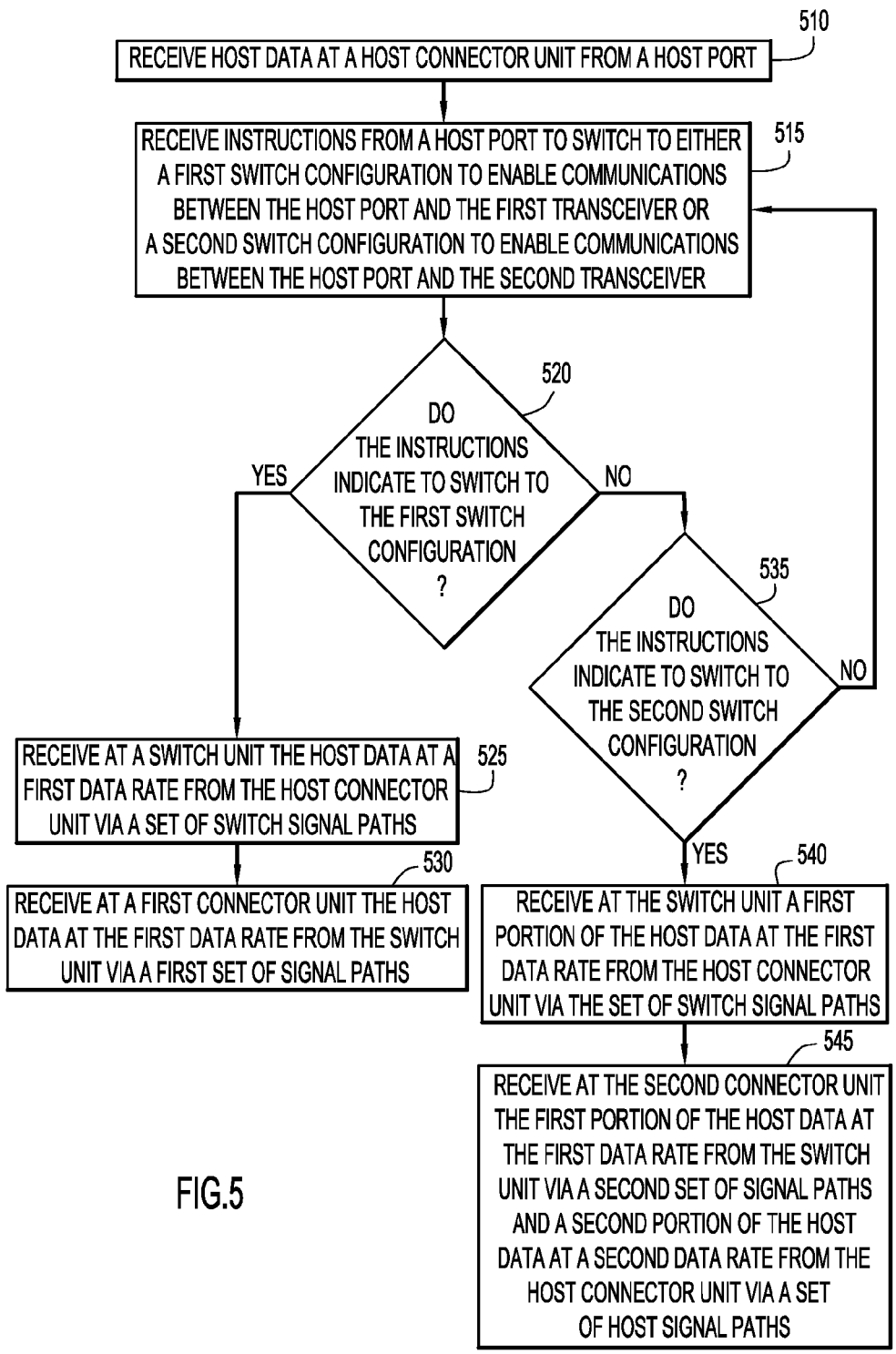
FIG. 5 is an example flow chart for host-to-module data communications between the transceiver devices.

Reference is now made to FIG. 5, which shows an example flow chart for host-to-module data communications between the host port 106 and the first transceiver 102 or the second transceiver 104. At operation 510, the adapter device 108 receives host data at a host connector unit (e.g., the host set of signal pins 226) from the host port 106. At operation 515, the adapter device 108 receives instructions from the host port to switch either to a first switch configuration to enable communications between the host port 106 and the first transceiver 102 or to a second switch configuration to enable communications between the host port and a second transceiver 102. At operation 520, the adapter device then determines whether the instructions indicate to switch to the first configuration. If so, (at block 525) the adapter device 108 receives at the switch unit 220 the host data at a first data rate from the host connector unit via a set of switch signal paths (e.g., signal paths 228) and, at operation 530, receives at the first connector unit 202 host data at the first data rate from the switch unit via a first set of signal paths.

If the answer to decision 520 is "no," the adapter device 108 determines, at 535, whether the instructions indicate to switch to the second switch configuration. If so, (at block 540) the adapter device receives at the switch unit 220 a first portion of the host data at the first data rate from the host connector unit via the set of switch signal paths and, at 545, receives at the second connector unit 204 the first portion of the host data at the first data rate from the switch unit 220 via a second set of signal paths (e.g., signal paths 224) and a second portion of the host data at a second data rate from the host connector unit via the set of host signal paths (e.g., signal paths 230). If the answer to decision 535 is "no," the adapter device reverts to operation 515.

It should be appreciated that the techniques described above in connection with all embodiments may be performed by one or more computer readable storage media that is encoded with software comprising computer executable instructions to perform the methods and steps described herein. For example, the operations performed by the adapter device 108 may be performed by one or more computer or machine readable storage media or device executed by a processor and comprising software, hardware or a combination of software and hardware to perform the techniques described herein.

In sum, an apparatus is provided comprising: a first connector unit configured to receive first data from a first transceiver; a second connector unit configured to receive second data from a second transceiver; a switch unit electrically connected to the first connector unit via a first set of signal paths and to the second connector unit via a second set of signal paths and configured to: receive first switch data from the first connector unit at a first data rate across the first set of signal paths in response to the first connector unit receiving the first data, wherein the first switch data comprises the first data; and receive second switch data from the second connector unit at the first data rate across the second set of signal paths in response the second connector unit receiving the second data, wherein the second switch data comprises a first portion of the second data received; and a third connector unit electrically connected to the switch unit via a third set of signal paths and to the second connector unit via a fourth set of signal paths and configured to: receive the first switch data or the second switch data from the switch unit across the third set of signal paths at the first data rate; receive a second portion of the second data from the second connector unit across the fourth set of signal paths at a second data rate in response to the second connector unit receiving the second data; send the first switch data to a host port in response to instructions received from the host port to send the first switch data; and send the second switch data and the second portion of the second data to the host port in response to instructions received from the host port to send the second switch data.

In addition, an apparatus is provided comprising: a host connector unit configured to receive host data from a host port; a switch unit electrically connected to the host connector unit via a set of switch signal paths and configured to receive control signals from the host port to switch to either a first switch configuration to send the host data at a first data rate from the host connector unit across the set of switch signal paths or a second switch configuration to send a first portion of the host data at the first data rate from the host connector unit; a first connector unit electrically connected to the switch unit via a first set of signal paths and configured to receive the host data at the first data rate via the first set of signal paths in response to the switch unit being in the first switch configuration; and a second connector unit electrically connected to the switch unit via a second set of signal paths and to the host connector unit via a set of host signal paths and configured to receive the first portion of the host data at the first data rate via the second set of signal paths and a second portion of the host data at the second data rate via the set of host signal paths in response to the switch unit being in the second switch configuration.

Furthermore, a method is provided comprising: at a form factor adapter device, receiving input data at a first connector unit from a first transceiver or at a second connector unit from a second transceiver; receiving instructions from a host port to switch to either a first switch configuration to enable communications between the host port and the first transceiver or a second switch configuration to enable communications between the host port and the second transceiver; in response to receiving instructions to switch to the first switch configuration: receiving at a switch unit the input data at a first data rate from the first connector unit via a first set of signal paths; receiving at a third connector unit the input data at the first data rate from the switch unit via a third set of signal paths; and sending the input data from the third connector unit to the host port; and in response to receiving instructions to switch to the second switch configuration: receiving at the switch unit a first portion of the input data at the first data rate via a second set of signal paths; receiving at the third connector unit the first portion of the input data at the first data rate from the switch unit via the third set of signal paths and a second portion of the input data at a second data rate from the second connector unit via a fourth set of signal paths; and sending the first portion of the input data and the second portion of the input data from third connector unit to the host port.

Additionally, a method is provided comprising: at a form factor adapter device, receiving host data at a host connector unit from a host port; receiving instructions from the host port to switch either to a first switch configuration to enable communications between the host port and a first transceiver or to a second switch configuration to enable communications between the host port and a second transceiver; in response to receiving instructions to switch to the first switch configuration: receiving at a switch unit the host data at a first data rate from the host connector unit via a set of switch signal paths; and receiving at a first connector unit the host data at the first data rate from the switch unit via a first set of signal paths; in response to determining that the output data is to be sent to the first transceiver via the first connector unit; and in response to receiving instructions to switch to the second switch configuration: receiving at the switch unit a first portion of the host data at the first data rate from the host connector unit via the set of switch signal paths; and receiving at the second connector unit the first portion of the host data at the first data rate from the switch unit via a second set of signal paths and a second portion of the host data at a second data rate from the host connector unit via a set of host signal paths.

The above description is intended by way of example only. Various modifications and structural changes may be made therein without departing from the scope of the concepts described herein and within the scope and range of equivalents of the claims.

What is claimed is:

1. An apparatus comprising:
   a first connector unit configured to receive first data from a first transceiver;
   a first set of signal paths electrically connecting the first connector unit and a switch unit;
   a second connector unit configured to receive second data from a second transceiver;
   a second set of signal paths electrically connecting the second connector unit and the switch unit;
   a third set of signal paths electrically connecting the switch unit and a third connector unit;
   a fourth set of signal paths electrically connecting the second connector unit and the third connector unit;
   the switch unit configured to:
     receive the first data from the first connector unit at a first data rate across the first set of signal paths in response to the first connector unit receiving the first data;
     receive a first portion of the second data from the second connector unit at the first data rate in response to the second connector unit receiving the second data,
     in response to instructions from a host port to send the first data, transfer switch data comprising the first data to the third connector unit at the first data rate across the third set of signal paths; and
     in response to instructions from the host port to send the second data, transfer switch data comprising the first portion of the second data to the third connector unit at the first data rate across the third set of signal paths; and
   the third connector unit configured to:
     receive the switch data from the switch unit across the third set of signal paths at the first data rate;
     receive a second portion of the second data from the second connector unit across the fourth set of signal paths at a second data rate in response to the second connector unit receiving the second data;
     send the switch data to the host port in response to the instructions from the host port to send the first data; and
     send the switch data and the second portion of the second data to the host port in response to the instructions received from the host port to send the second data.

2. The apparatus of claim 1, wherein the switch unit further comprises a pair of differential signal input ports configured to:
   receive the switch data comprising the first data at a first input port of the differential signal input ports; and
   receive the switch data comprising the first portion of the second data at a second input port of the differential signal input ports.

3. The apparatus of claim 2, wherein the switch unit is further configured to:
   receive the switch data comprising the first data across the first set of signal paths comprising four signal paths between the first connector unit and the switch unit; and
   receive the switch data comprising the first portion of the second data across the second set of signal paths comprising four signal paths between the second connector unit and the switch unit.

4. The apparatus of claim 1, wherein the switch unit is further configured to:
   receive the switch data comprising the first data at the first data rate of up to 40 gigabits per second across the first set of signal paths; and
   receive the switch data comprising the first portion of the second data at the second data rate of up to 40 gigabits per second across the second set of signal paths.

5. The apparatus of claim 1, wherein the third connector unit is further configured to receive the second portion of the second data at the second data rate of up to 60 gigabits per second across the fourth set of signal paths.

6. The apparatus of claim 1, wherein the first connector unit is further configured to receive the first data from a quad small form-factor pluggable (QSFP+) transceiver and wherein the second connector unit is configured to receive the second data from a transceiver configured to send and receive data at a data rate of up to 100 gigabits per second.

7. The apparatus of claim 1, wherein the third connector unit is further configured to send data to the host port comprising a form factor module configured to support data according to the 40 gigabits per second (40G) Ethernet standard and the 100 gigabits per second (100G) Ethernet standard.

8. The apparatus of claim 1, further comprising:
   a first clock and data recovery (CDR) unit coupled to a power switch unit and the first connector unit;
   a second CDR unit coupled to the power switch unit and the second connector unit; and
   the power switch unit coupled to the first CDR unit and the second CDR unit and configured to:
      switch off power delivery from the power switch unit to the first CDR unit in response to power being delivered from the power switch unit to the second CDR unit; and
      switch off power delivery from the power switch unit to the second CDR unit in response to power being delivered from the power switch unit to the first CDR unit.

9. An apparatus comprising:
   a host connector unit configured to receive host data and instructions from a host port to send the host data to either a first connector unit or a second connector unit, wherein the host connector unit transfers the host data to a switch unit in response to instructions to send the host data to the first connector, and wherein the host connector sends a first portion of the host data to the switch unit and a second portion of the host data to the second connector in response to instructions to send the host data to the second connector;
   the switch unit electrically connected to the host connector unit via a set of switch signal paths and configured to receive instructions from the host port to switch to either a first switch configuration to send the host data at a first data rate from the host connector unit across the set of switch signal paths or a second switch configuration to send the first portion of the host data at the first data rate from the host connector unit;
   the first connector unit electrically connected to the switch unit via a first set of signal paths and configured to receive the host data at the first data rate via the first set of signal paths in response to the switch unit being in the first switch configuration; and
   the second connector unit electrically connected to the switch unit via a second set of signal paths and to the host connector unit via a set of host signal paths and configured to receive the first portion of the host data at the first data rate via the second set of signal paths and the second portion of the host data at the second data rate via the set of host signal paths in response to the switch unit being in the second switch configuration.

10. The apparatus of claim 9, wherein the switch unit further comprises a pair of differential signal output ports configured to:
    send the first portion of the host data at the first data rate to the first connector unit from a first output port of the differential signal output ports; and
    send the first portion of the host data at the first data rate to the second connector unit from a second output port of the differential signal output ports.

11. The apparatus of claim 9, wherein the first connector unit is further configured to receive the first portion of the host data at the first data rate of up to 40 gigabits per second.

12. The apparatus of claim 9, wherein the second connector unit is further configured to receive the host data at the first data rate of up to 40 gigabits per second in response to the switch unit being in the first switch configuration and the second portion of the host data at the second data rate of up to 60 gigabits per second in response to the switch unit being in the second switch configuration.

13. The apparatus of claim 9, wherein the first connector unit is configured to send data to a quad small form-factor pluggable (QSFP+) module and wherein the second connector unit is configured to send data to a transceiver configured to send and receive data at a data rate of up to 100 gigabits per second.

14. A method comprising:
    at a form factor adapter device, receiving input data at a first connector unit from a first transceiver or at a second connector unit from a second transceiver;
    receiving instructions from a host port to switch to either a first switch configuration to enable communications between the host port and the first transceiver or a second switch configuration to enable communications between the host port and the second transceiver;
    in response to receiving instructions to switch to the first switch configuration:
       receiving at a switch unit the input data at a first data rate from the first connector unit via a first set of signal paths;
       receiving at a third connector unit the input data at the first data rate from the switch unit via a third set of signal paths; and
       sending the input data from the third connector unit to the host port; and
    in response to receiving instructions to switch to the second switch configuration:

receiving at the switch unit a first portion of the input data at the first data rate via a second set of signal paths;

receiving at the third connector unit the first portion of the input data at the first data rate from the switch unit via the third set of signal paths and a second portion of the input data at a second data rate from the second connector unit via a fourth set of signal paths; and sending the first portion of the input data and the second portion of the input data from third connector unit to the host port.

15. The method of claim 14, wherein receiving the input data at the switch unit comprises receiving the input data at a first input port of a pair of differential signal input ports of the switch unit and wherein receiving the first portion of the input data at the switch unit comprises receiving the input data at a second input port of the pair of differential signal input ports.

16. The method of claim 14, further comprising:

switching off power delivery from a power switch unit to a first clock and data recovery (CDR) unit coupled to the power switch unit and the first connector unit in response to receiving instructions to switch to the second switch configuration; and switching off power delivery from the power switch unit to a second CDR unit coupled to the power switch unit and the second connector unit in response to receiving instructions to switch to the first switch configuration.

17. The method of claim 14, wherein receiving the input data at the third connector unit comprises receiving the input data at the first data of up to 40 gigabits per second.

18. The method of claim 14, wherein receiving the first portion of the input data at the third connector comprises receiving the first portion of the input data at the first data rate of up to 40 gigabits per second and wherein receiving the second portion of the input data at the third connector comprises receiving the second portion of the input data at the second data rate of up to 60 gigabits per second.

19. A method comprising:

at a form factor adapter device, receiving host data at a host connector unit from a host port;

receiving instructions from the host port to switch either to a first switch configuration to enable communications between the host port and a first transceiver or to a second switch configuration to enable communications between the host port and a second transceiver;

in response to receiving instructions to switch to the first switch configuration:

receiving at a switch unit the host data at a first data rate from the host connector unit via a set of switch signal paths; and receiving at a first connector unit the host data at the first data rate from the switch unit via a first set of signal paths; and in response to receiving instructions to switch to the second switch configuration:

receiving at the switch unit a first portion of the host data at the first data rate from the host connector unit via the set of switch signal paths; and receiving at the second connector unit the first portion of the host data at the first data rate from the switch unit via a second set of signal paths and a second portion of the host data at a second data rate from the host connector unit via a set of host signal paths.

20. The method of claim 19, wherein receiving the host data at the first connector unit comprises receiving the host data at the first data rate from a first output port of a pair of differential signal output ports and wherein receiving the first portion of the host data at the second connector unit comprises receiving the first portion of the output data at the first data rate from a second output port of the pair of differential signal output ports.

* * * * *